(12) United States Patent
Fan et al.

(10) Patent No.: US 9,695,057 B2
(45) Date of Patent: Jul. 4, 2017

(54) SAPO-34 MOLECULAR SIEVE AND METHOD FOR PREPARING THE SAME

(71) Applicant: Dalian Institute of Chemical Physics, Chinese Academy of Sciences, Liaoning (CN)

(72) Inventors: Dong Fan, Liaoning (CN); Peng Tian, Liaoning (CN); Zhongmin Liu, Liaoning (CN); Xiong Su, Liaoning (CN); Ying Zhang, Liaoning (CN); Yue Yang, Liaoning (CN)

(73) Assignee: DALIAN INSTITUTE OF CHEMICAL PHYSICS, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 14/428,830

(22) PCT Filed: Sep. 26, 2012

(86) PCT No.: PCT/CN2012/081995
§ 371 (c)(1),
(2) Date: Mar. 17, 2015

(87) PCT Pub. No.: WO2014/047801
PCT Pub. Date: Apr. 3, 2014

(65) Prior Publication Data
US 2015/0232345 A1    Aug. 20, 2015

(51) Int. Cl.
*C01B 39/54* (2006.01)
*B01J 29/85* (2006.01)
*B01J 37/08* (2006.01)
*B01J 37/00* (2006.01)

(52) U.S. Cl.
CPC .............. *C01B 39/54* (2013.01); *B01J 29/85* (2013.01); *B01J 37/009* (2013.01); *B01J 37/0018* (2013.01); *B01J 37/08* (2013.01); *B01J 2231/763* (2013.01)

(58) Field of Classification Search
CPC .. C01B 39/54; B01J 29/85; B01J 37/08; B01J 37/0018; B01J 37/009; B01J 2231/763
See application file for complete search history.

(56) References Cited

U.S. PATENT DOCUMENTS

| | | | | |
|---|---|---|---|---|
| 4,310,440 A * | 1/1982 | Wilson | ................ | B01J 20/0292 208/112 |
| 4,440,871 A * | 4/1984 | Lok | ........................ | B01J 20/18 208/114 |
| 8,232,296 B2 * | 7/2012 | Briggner | .............. | C07D 401/14 514/333 |
| 2005/0249661 A1 * | 11/2005 | Higuchi | ................... | B01J 29/85 423/700 |
| 2013/0280161 A1 * | 10/2013 | Tian | ........................ | B01J 29/85 423/706 |
| 2015/0231616 A1 * | 8/2015 | Tian | ........................ | B01J 29/85 423/708 |
| 2015/0232345 A1 * | 8/2015 | Fan | ........................ | C01B 39/54 423/705 |

FOREIGN PATENT DOCUMENTS

| | | | | |
|---|---|---|---|---|
| CA | EP 2906554 A1 * | 8/2015 | ........... | C07D 401/14 |
| CN | 1087292 A | 6/1994 | | |
| CN | 1088483 A | 6/1994 | | |
| CN | 1038125 C | 4/1998 | | |
| CN | 1048429 C | 1/2000 | | |
| CN | 1131845 C | 12/2003 | | |
| CN | 101993093 A | 3/2011 | | |
| CN | 102530987 A | 7/2012 | | |
| KR | 2005-0024285 A | 3/2005 | | |
| WO | 03/040037 A1 | 5/2003 | | |

OTHER PUBLICATIONS

Jenkins et al, "Introduction to X-ray Powder Diffractometry", Chapter 3, (1996).*
Goodson, "Challenges and Strategies for Patenting New Solid Forms", (2014).*
Applied Catalysis, 1988, vol. 40, No. 1-2, p. 316.
Anderson, et al., "In Situ Solid-state NMR Studies of the Catalytic Conversion of Methanol on the Molecular Sieve SAPO-34" J. Phys. Chem., 1990, 94, 2730-2734.
Hereijgers, et al., "Product shape selectivity dominates the Methanol-to-Olefins (MTO) reaction over H-SAPO-34 catalysts", J. Catal., 2009, 264, 77-87.
Vomscheid, et al., "The Role of the Template in Directing the Si Distribution in SAPO Zeolites", J. Phys. Chem., 1994, 98, 9614-9618.
Mores, et al., "Space- and Time-Resolved In-situ Spectroscopy on the Coke Formation in Molecular Sieves: Methanol-to-Olefin Conversion over H-ZSM-5 and H-SAPO-34", Chemistry—A European Journal, 2008, 14, 11320-11327.
International Search Report dated Mar. 19, 2013 corresponding to application No. PCT/CN2012/081995.

(Continued)

*Primary Examiner* — David M Brunsman
(74) *Attorney, Agent, or Firm* — Nath, Goldberg & Meyer; Joshua B. Goldberg; Tanya E. Harkins

(57) ABSTRACT

The present invention concerns a SAPO-34 molecular sieve and method for preparing the same, whose chemical composition in the anhydrous state is expressed as: mDIPA·$(Si_xAl_yP_z)O_2$, wherein, DIPA is diisopropylamine existing in cages and pore channels of said molecular sieve, wherein m is the molar number of diisopropylamine per one mole of $(SixAlyPz)O_2$, and m is from 0.03 to 0.25; x, y, z respectively represents the molar number of Si, Al, P, and x is from 0.01 to 0.30, and y is from 0.40 to 0.60, and z is from 0.25 to 0.49, and x+y+z=1. The SAPO-34 molecular sieve can be used as catalysts for acid-catalyzed reaction or oxygenate to olefins reaction.

18 Claims, 1 Drawing Sheet

(56) References Cited

OTHER PUBLICATIONS

Minchev, Ch., et al., "Thermal Decomposition of Organic Templates in Silicoaluminophosphate Molecular Sieves with Various Structures", Journal of Thermal Analysis, vol. 37, pp. 573-582, 1991.

Fan, Dong, et al., "A novel solvothermal approach to synthesize SAPO molecular sieves using organic amines as the solvent and template", Journal of Materials Chemistry, vol. 22, pp. 6568-6574, 2012.

Li, Hongyuan, et al., "Synthesis of Silicoaluminophosphate Zeolites SAPO-11, SAPO-34, and SAPO-20", online abstract XP-002755438, p. 1, Entered STN: Oct. 1, 1988.

\* cited by examiner

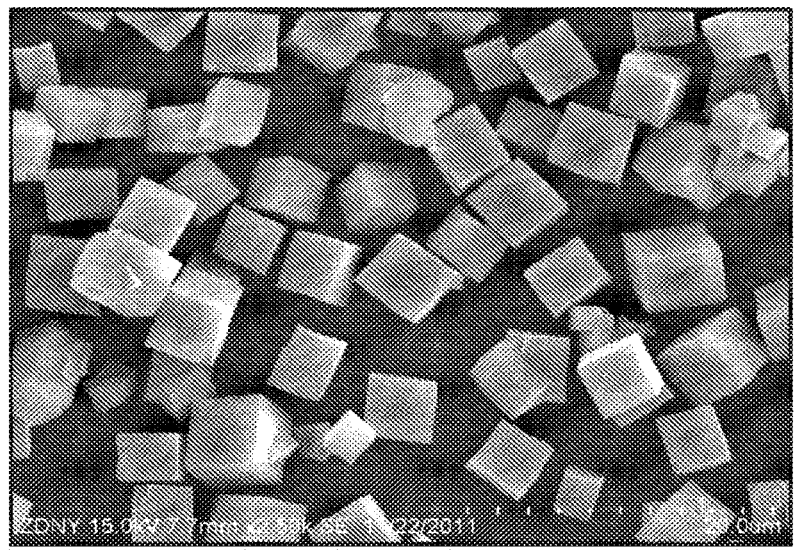

SAPO-34 MOLECULAR SIEVE AND METHOD FOR PREPARING THE SAME

This is a National Phase Application filed under 35 U.S.C. 371 as a national stage of PCT/CN2012/081995, filed Sep. 26, 2012, the content of which is hereby incorporated by reference in its entirety.

TECHNICAL FIELD

The present invention belongs to the field of SAPO molecular sieves, and specifically concerns a SAPO-34 molecular sieve containing the template agent of diisopropylamine, and hydrothermal method for preparing the same.

BACKGROUND

In 1982, a series of novel silicoaluminophosphate SAPO molecular sieves were successfully synthesized by the Union Carbide Corporation, which was disclosed in U.S. Pat. No. 4,310,440. Since then silicoaluminophosphate molecular sieve and its heteroatom-substituted derivatives have been one research focus in the field of materials and catalysis. Among these molecular sieves, silicoaluminophosphate SAPO-34 molecular sieve with CHA type framework has shown an excellent catalytic performance in methanol to olefins (MTO) process, due to its proper acidity and pore structure (Applied Catalysis, 1988, 40: 316).

SAPO-34 is a molecular sieve with chabazite-type framework containing 8-member ring ellipsoidal cage and 3-dimensional channel, which is formed by stacking of double six-rings according to ABC sequence. SAPO-34 is microporous molecular sieve with a pore size of 0.38×0.38 nm and cage size of 1.0×0.67 nm. Space group of SAPO-34 is R3m belonging to trigonal crystal system (J. Phys. Chem., 1990, 94: 2730). SAPO-34 is formed by Si, Al, P and O whose composition change at some range, generally in the order of n(Si)<n(P)<n(Al).

SAPO-34 molecular sieve is generally produced by a hydrothermal synthesis process which uses water as the solvent and is conducted in a sealed autoclave. The components for the synthesis comprise an aluminum source, a silicon source, a phosphorus source, a structural-directing agent and deionized water. The silicon source may be chosen from silica sol, active silica and orthosilicate ester. The aluminum source may be chosen from active alumina, pseudoboehmite and alkoxy aluminum. Preferable silicon source and aluminum source are silica sol and pseudoboehmite. Phosphorus source is generally 85% phosphoric acid. The structural-directing agent partly affects the microstructure, elemental composition, morphology of synthesized molecular sieve, thus producing an impact on the catalytic performance of synthesized molecular sieve. Preparation methods of multiple SAPO molecular sieves have been reported in U.S. Pat. Nos. 4,310,440 and 4,440,871, and the template agents used to synthesize SAPO-34 were tetraethyl ammonium hydroxide, isopropylamine, and a mixture of tetraethyl ammonium hydroxide and dipropylamine. A method for preparing SAPO-34 molecular sieve was published in Chinese patent ZL93112230 using triethylamine with low price as the temple agent, reducing the cost of synthesis. Hereafter, methods for preparing SAPO-34 molecular sieve were published in Chinese patent ZL93112015 and ZL94110059 using diethylamine and a mixture of diethylamine and triethylamine respectively, further reducing the cost of synthesis.

A method for preparing SAPO-34 molecular sieve was published in Chinese patent CN1131845C using multiple temple agents containing diisopropylamine. A method for preparing SAPO molecular sieves was published in international patent WO 03/040037A1 via a dry process of solid precursor, in which it was mentioned that diisopropylamine could be used as a template agent, and the product was uncertainly describe as SAPO molecular sieves, including SAPO-34 molecular sieve. It is worth noting that although the template agents included diisopropylamine, diisopropylamine was used as a template agent in none of above patent examples.

Usually, with the increase of Si content in SAPO molecular sieves, the Si coordination structures change from Si(4Al) to Si(nAl) (n=0 to 4) (in different kind of SAPO molecular sieves, the allowable maximum of single Si distribution in the frameworks are different, seeing J. Phys. Chem., 1994, 98, 9614). The Si coordination structures have significant effect on the acid density and the acid intensity, and the acid intensity is enhanced in the order of Si(1Al)>Si(2Al)>Si(3Al)>Si(4Al). In the other hand, the amount of acid center produced by each Si atom decrease with the appearance of Si islands in the framework of SAPO molecular sieves (Si(4Al) is 1, and the others are less 1), leading to the decrease of the acid density. It is supposed that using the SAPO molecular sieves as the acid catalyst, the catalytic performance must be effected by the distribution of Si in the framework since the non-uniform distribution of Si in crystal bring the non-uniform distribution of acidity. The enrichment of Si on the surface of crystal indicates that the Si coordination structures on the surface of crystal are more complex than inside the crystal. Weckhuysen et al have reported that in the process of methanol to olefin (MTO), reaction firstly occurs near the surface of crystal, and with the reaction going on, the large coke species form and block the pores progressively, making the diffusion of the products inside the crystal more difficult (Chemistry—A European Journal, 2008, 14, 11320-11327; J. Catal., 2009, 264, 77-87). It indicates that the acid environment on the surface of crystal is very important to the catalytic performance, and it is significant to seek a control method of the degree of Si enrichment on the molecular sieve surfaces.

Disclosure

An object of the present invention is to provide a SAPO-34 molecular sieve containing template agent diisopropylamine. The chemical composition in the anhydrous state of said molecular sieve is expressed as: $mDIPA \cdot (Si_xAl_yP_z)O_2$; wherein, DIPA is diisopropylamine existing in cages and pore channels of said molecular sieve; m is the molar number of diisopropylamine per one mole of $(Si_xAl_yP_z)O_2$, and m is from 0.03 to 0.25; x, y, z respectively represents the molar number of Si, Al, P, and x is from 0.01 to 0.30, and y is from 0.40 to 0.60, and z is from 0.25 to 0.49, and $x+y+z=1$. There is a slight Si enrichment phenomenon on the crystal surface of said molecular sieve crystal, and the ratio of the surface Si content to the bulk Si content of the crystal ranges from 1.48 to 1.01; wherein the Si content is calculated by the molar ratio of Si/(Si+Al+P).

In X-ray diffraction spectrogram of said SAPO-34 molecular sieve, the diffraction peaks are included shown in Table 2. There is a slight Si enrichment phenomenon on the crystal surface of said molecular sieve crystal, and the ratio of the surface Si content to the bulk Si content of the crystal ranges from 1.48 to 1.01, preferably ranges from 1.42 to 1.02, further preferably ranges from 1.36 to 1.03, and more further preferably ranges from 1.33 to 1.03; wherein the Si content is calculated by the molar ratio of Si/(Si+Al+P). The Si contents from core to shell of said molecular sieve crystals increase uniformly or non-uniformly.

Another object of the present invention is to provide a method for preparing SAPO-34 molecular sieve.

Another object of the present invention is to provide a SAPO-34 molecular sieve prepared using the above method and catalysts prepared from the same for acid-catalyzed reaction or an oxygenate to olefins reaction.

The technical problem to be solved in the present invention is that the SAPO-34 molecular sieve with high purity is hydrothermally prepared directly using diisopropylamine as the template agent, and selecting the silicon source, the aluminum source, and the phosphorus source from traditional ingredients. There is a slight Si enrichment phenomenon on the crystal surface of said molecular sieve crystal, and the ratio of the surface Si content to the bulk Si content of the crystal ranges from 1.48 to 1.01; wherein the Si content is calculated by the molar ratio of Si/(Si+Al+P). Through experimental research, the inventers of the present invention found that the degree of Si enrichment on the molecular sieve surfaces can be decreased by adding a surfactant.

The present invention provides a hydrothermal method for preparing said SAPO-34 molecular sieve.

The present invention reports said method for preparing SAPO-34 molecular sieve, charactered in including the steps as follows:

(a) a silicon source, an aluminum source, a phosphorus source, a surfactant BM, deionized water and structural-directing agent DIPA are mixed, and an initial gel mixture with following molar ratio is obtained:

$SiO_2/Al_2O_3$ is from 0.05 to 1.5;
$P_2O_5/Al_2O_3$ is from 0.5 to 1.5;
$H_2O/Al_2O_3$ is from 16 to 150;
$DIPA/Al_2O_3$ is from 2.0 to 5.9;
$BM/Al_2O_3$ is from 0.001 to 0.05;

(b) the initial gel mixture obtained in said step (a) is transferred into a synthetic kettle, then sealed and heated to crystallization temperature range from 150° C. to 220° C., crystallized for crystallization time range from 0.5 h to 72 h under an autogenous pressure;

(c) after finishing the crystallization, the solid product is centrifugal separated, washed to neutral using deionized water and dried to obtain said SAPO-34 molecular sieve;

wherein, said structural-directing agent DIPA is diisopropylamine; said surfactant BM is alkyl ammonium halide.

In said step (a), the silicon source is one or more selected from silica sol, active silica, orthosilicate esters and metakaolin; the aluminum source is one or more selected from aluminum salts, activated alumina, aluminum alkoxide and metakaolin; the phosphorus source is one or more selected from phosphoric acid, diammonium hydrogen phosphate, ammonium dihydrogen phosphate, organophosphorous compounds and phosphorus oxides.

Said surfactant BM is alkyl ammonium halide. Preferably said surfactant BM is one or more selected from dodecyl trimethyl ammonium chloride, tetradecyl trimethyl ammonium chloride, hexadecyl trimethyl ammonium chloride, octadecyl trimethyl ammonium chloride, dodecyl trimethyl ammonium bromide, tetradecyl trimethyl ammonium bromide, hexadecyl trimethyl ammonium bromide, octadecyl trimethyl ammonium bromide.

In the initial gel mixture obtained in said step (a), the preferable molar ratio of $H_2O/Al_2O_3$ is from 26 to 120, and further preferably the molar ratio of $H_2O/Al_2O_3$ is from 31 to 100.

In the initial gel mixture obtained in said step (a), the molar ratio of $DIPA/Al_2O_3$ is from 3.0 to 5.0.

In the initial gel mixture obtained in said step (a), the molar ratio of $BM/Al_2O_3$ is from 0.001 to 0.03.

In said step (b), preferably the crystallization condition are the crystallization temperature range from 170° C. to 210° C. and the crystallization time range from 1 h to 60 h; and further preferably the crystallization condition are the crystallization temperature range from 180° C. to 210° C. and the crystallization time range from 1 h to 24 h; and more further preferably the crystallization condition are the crystallization temperature range from 190° C. to 210° C. and the crystallization time range from 1 h to 12 h.

In said step (b), the crystallization is carried out dynamically or statically.

The SAPO-34 molecular sieves prepared by said methods can be used as catalysts for acid-catalyzed reaction after calcining at a temperature from 400 to 700° C. in air.

The SAPO-34 molecular sieves prepared by said methods can be used as catalysts for an oxygenate to olefins reaction after calcining at a temperature from 400 to 700° C. in air.

The present invention also refers to a catalyst for acid-catalyzed reaction, which is obtained by calcining at least one of said SAPO-34 molecular sieves or at least one of the SAPO-34 molecular sieves prepared by said methods, at a temperature from 400 to 700° C. in air.

The present invention also refers to a catalyst for an oxygenate to olefins reaction, which is obtained by calcining at least one of said SAPO-34 molecular sieves or at least one of the SAPO-34 molecular sieves prepared by said methods, at a temperature from 400 to 700° C. in air.

The present invention can bring the advantages including:

(1) obtaining a SAPO-34 molecular using diisopropylamine as the template agent, characterized in a slight Si enrichment phenomenon on the crystal and with the ratio of the surface Si content to the bulk Si content of the crystal ranging from 1.48 to 1.01.

(2) the SAPO-34 molecular sieves prepared by said methods in present invention having excellent catalytic performance in the MTO reaction and ethanol dehydration reaction.

BRIEF DESCRIPTION OF THE DRAWINGS

FIG. 1 is a scanning electron microscope image of the sample prepared in Example 1.

SPECIFIC EMBODIMENTS OF THE INVENTION

The present invention will be described in details by Examples, but the present invention is not limited to these Examples.

In Examples, abbreviations are used as follows:

Diisopropylamine is abbreviated as DIPA; dodecyl trimethylammonium bromide is abbreviated as DTAB; tetradecyl trimethylammonium bromide is abbreviated as TTAB; cetyl trimethylammonium bromide is abbreviated as CTAB; octadecyl trimethylammonium bromide is abbreviated as OTAB; dodecyl trimethylammonium chloride is abbreviated as DTAC; tetradecyl trimethylammonium chloride is abbreviated as TTAC; cetyl trimethylammonium chloride is abbreviated as CTAC; octadecyl trimethylammonium chloride is abbreviated as OTAC.

The elemental analysis of the bulk composition was determined with X-ray Fluorescence (XRF) at PANalytical X'Pert PRO X-ray diffractometer with Cu target (λ=0.15418 nm), operated at 40 KV and 100 mA.

The elemental analysis of the surface composition was determined with X-ray photoelectron spectroscopy at Thermo ESCALAB 250Xi X-Ray Photoelectron Spectrometer (Mono AlKα X-ray source) using Al2p=74.7 eV of $Al_2O_3$ in sample surface as internal standard to calibrate charge of sample surface.

EXAMPLE 1

The amount of ingredients and the crystallization condition were shown in Table 1. The synthesis process was as follows: 14.06 g of pseudoboehmite (with $Al_2O_3$ mass percent of 72.5%) and 90 g of deionized water mixing homogeneously by stirring, and then 23.0 g of phosphoric acid (with $H_3PO_4$ mass percent of 85%) was added by droplets and stirred to smooth, and then 6.4 g of silica sol (with $SiO_2$ mass percent of 30%) and 1.09 g cetyl trimethyl ammonium bromide (CTAB) were added, and then 30.4 g of diisopropylamine (abbreviated as DIPA, with a mass percent of 99%) was added into the mixture to obtain an initial gel mixture with the molar ratio of 3.0DIPA: $0.30SiO_2$:$1Al_2O_3$:$1P_2O_5$:$0.03CTAB$:$50H_2O$. The initial gel mixture was transferred into a stainless steel synthetic kettle.

The synthetic kettle was heated to 200° C., dynamically crystallized for 24 h. After finishing the crystallization, the solid product was centrifugal separated, washed and dried at 100° C. in air to obtain 27.6 g of raw powder sample. The sample was detected with XRD and XRD data were shown in Table 2, indicating that the sample prepared was SAPO-34 molecular sieve. The scanning electron microscope image of the sample was illustrated in FIG. 1.

The elemental analysis of the surface composition and the bulk composition of the sample were detected with XPS and XRF, respectively. The ratio of the surface Si content to the bulk Si content was shown in Table 1. The bulk composition of the sample obtained in Example 1 was $Al_{0.49}P_{0.43}Si_{0.08}$.

The organic content of the sample obtained in Example 1 was detected with CHN analyzer, indicating the molar ratio of C/N was 6.01. The chemical compositions of the raw powder of molecular sieve were obtained by normalization of CHN and XRF results, which was 0.08DIPA·$(Si_{0.08}Al_{0.49}P_{0.40})O_2$.

The raw powder sample was detected with $^{13}C$ MAS NMR analysis, and the result showed that only the characteristic $^{13}C$ resonance of DIPA was observed without any characteristic $^{13}C$ resonance of CTAB observed, indicating CTAB didn't enter into the final product.

TABLE 1

The list of amount of ingredients and crystallization conditions of the molecular sieves*

| Example | Molar amount of DIPA | Aluminum source and molar amount of $Al_2O_3$ thereof | Phosphorus source and molar amount of $P_2O_5$ thereof | Silicon source and molar amount of $SiO_2$ thereof | $H_2O$ | BM and molar amount thereof | Crystallization Temperature | Crystallization Time | $Si_{surface}/Si_{bulk}$ |
|---|---|---|---|---|---|---|---|---|---|
| 1 | 0.3 mol | pseudoboehmite 0.1 mol | phosphoric acid 0.10 mol | silica sol 0.03 mol | 5.0 mol | CTAB 0.003 mol | 200° C. | 24 h | 1.06 |
| 2 | 0.59 mol | aluminium isopropoxide 0.1 mol | phosphoric acid 0.10 mol | silica sol 0.005 mol | 1.6 mol | DTAB 0.0001 mol | 150° C. | 48 h | 1.01 |
| 3 | 0.12 mol | kaolinite 0.1 mol | phosphoric acid 0.10 mol | silica sol 0.15 mol | 15 mol | OTAB 0.001 mol | 180° C. | 24 h | 1.29 |
| 4 | 0.18 mol | γ-alumina 0.1 mol | phosphoric acid 0.10 mol | silica sol 0.12 mol | 8.3 mol | TTAB 0.005 mol | 200° C. | 24 h | 1.48 |
| 5 | 0.5 mol | aluminum sulfate 0.1 mol | phosphoric acid 0.05 mol | active silica 0.03 mol | 2.6 mol | CTAC 0.002 mol | 190° C. | 12 h | 1.42 |
| 6 | 0.3 mol | aluminium chloride 0.1 mol | phosphoric acid 0.12 mol | ethyl orthosilicate 0.08 mol | 12 mol | DTAC 0.003 mol | 200° C. | 24 h | 1.25 |
| 7 | 0.033 mol | pseudoboehmite 0.1 mol | phosphoric acid 0.09 mol | silica sol 0.03 mol | 3.1 mol | OTAC 0.004 mol | 200° C. | 24 h | 1.33 |
| 8 | 0.08 mol | metakaolin 0.1 mol | phosphoric acid 0.15 mol | silica sol 0.05 mol | 10 mol | TTAC 0.002 mol | 200° C. | 24 h | 1.36 |
| 9 | 0.26 mol | pseudoboehmite 0.1 mol | ammonium dihydrogen phosphate 0.10 mol | silica sol 0.06 mol | 6.6 mol | OTAC 0.001 mol | 220° C. | 0.5 h | 1.03 |
| 10 | 0.2 mol | pseudoboehmite 0.1 mol | diammonium hydrogen phosphate 0.10 mol | metakaolin 0.06 mol | 5.2 mol | CTAC 0.0009 mol | 200° C. | 24 h | 1.12 |
| 11 | 0.2 mol | aluminum sulfate 0.1 mol | diammonium hydrogen phosphate 0.15 mol | silica sol 0.07 mol | 8.8 mol | DTAC 0.002 mol | 200° C. | 18 h | 1.18 |
| 12 | 0.3 mol | pseudoboehmite 0.1 mol | diammonium hydrogen phosphate 0.12 mol | silica sol 0.12 mol | 6.5 mol | CTAB 0.002 mol | 180° C. | 24 h | 1.27 |
| 13 | 0.4 mol | pseudoboehmite 0.1 mol | phosphoric anhydride 0.13 mol | metakaolin 0.03 mol | 12 mol | DTAB 0.003 mol | 210° C. | 1 h | 1.22 |
| 14 | 0.39 mol | pseudoboehmite 0.1 mol | phosphoric acid 0.10 mol | silica sol 0.03 mol | 4.5 mol | OTAB 0.004 mol | 190° C. | 12 h | 1.45 |

TABLE 1-continued

The list of amount of ingredients and crystallization conditions of the molecular sieves*

| Example | Molar amount of DIPA | Aluminum source and molar amount of $Al_2O_3$ thereof | Phosphorus source and molar amount of $P_2O_5$ thereof | Silicon source and molar amount of $SiO_2$ thereof | $H_2O$ | BM and molar amount thereof | Crystallization Temperature | Crystallization Time | $Si_{surface}/Si_{bulk}$ |
|---|---|---|---|---|---|---|---|---|---|
| 15 | 0.39 mol | aluminum nitrate 0.1 mol | phosphoric acid 0.10 mol | tetramethyl orthosilicate 0.03 mol | 6.5 mol | TTAB 0.003 mol | 150° C. | 72 h | 1.40 |
| 16 | 0.30 mol | pseudoboehmite 0.1 mol | trimethyl phosphine 0.10 mol | silica sol 0.03 mol | 6.5 mol | CTAB 0.003 mol | 210° C. | 5 h | 1.33 |
| 17 | 0.35 mol | pseudoboehmite 0.1 mol | triethyl phosphine 0.10 mol | silica sol 0.03 mol | 6.5 mol | DTAB 0.003 mol | 170° C. | 60 h | 1.12 |
| 18 | 0.24 mol | pseudoboehmite 0.1 mol | phosphoric acid 0.10 mol | silica sol 0.03 mol | 5.0 mol | CTAB 0.002 mol + OTAB 0.001 mol | 200° C. | 24 h | 1.10 |
| 19 | 0.25 mol | pseudoboehmite 0.1 mol | phosphoric acid 0.10 mol | silica sol 0.03 mol | 5.0 mol | CTAB 0.001 mol + CTAC 0.001 mol + DTAB 0.001 mol | 200° C. | 24 h | 1.08 |

TABLE 2

XRD result of the sample obtained in Example 1

| No. | 2θ | d(Å) | 100 × $I/I_0$ |
|---|---|---|---|
| 1 | 9.5177 | 9.29267 | 100 |
| 2 | 12.7987 | 6.91689 | 19.92 |
| 3 | 14.1388 | 6.26416 | 13.11 |
| 4 | 15.9829 | 5.5453 | 50.04 |
| 5 | 18.1242 | 4.89469 | 22.4 |
| 6 | 20.5413 | 4.32386 | 84.84 |
| 7 | 22.278 | 3.99057 | 6.09 |
| 8 | 23.0981 | 3.85071 | 4.97 |
| 9 | 25.3853 | 3.50871 | 23.15 |
| 10 | 25.7835 | 3.45542 | 18.75 |
| 11 | 27.5448 | 3.23834 | 3.71 |
| 12 | 28.5382 | 3.12783 | 2.09 |
| 13 | 29.5454 | 3.02346 | 5.07 |
| 14 | 30.4947 | 2.93147 | 25.16 |
| 15 | 31.3812 | 2.85065 | 18.51 |
| 16 | 34.3501 | 2.61076 | 6.33 |
| 17 | 36.4789 | 2.46314 | 2.67 |
| 18 | 39.6546 | 2.2729 | 3.18 |
| 19 | 43.4168 | 2.08427 | 5.1 |
| 20 | 47.4822 | 1.91487 | 2.79 |
| 21 | 49.1405 | 1.85407 | 5.48 |
| 22 | 50.4542 | 1.80883 | 3.22 |
| 23 | 51.1735 | 1.78508 | 3.43 |
| 24 | 53.0514 | 1.72624 | 2.25 |
| 25 | 53.9912 | 1.69839 | 1.01 |
| 26 | 54.7895 | 1.67552 | 1.62 |
| 27 | 55.7846 | 1.64797 | 2.24 |
| 28 | 56.4017 | 1.63139 | 1.57 |
| 29 | 59.6235 | 1.55071 | 0.97 |
| 30 | 60.8263 | 1.52163 | 1.28 |

EXAMPLES 2 to 17

The amount of ingredients and the crystallization conditions were shown in Table 1, and the synthesis processes were the same as Example 1.

The samples were detected with XRD. XRD data of samples were similar to Table 2, which showed that each corresponding peak had the same peak position and the ±10% difference of peak intensity, indicating the samples prepared were SAPO-34 molecular sieves.

The elemental analysis of the surface composition and the bulk composition of the sample were detected with XPS and XRF, and the ratios of the surface Si content to the bulk Si content were shown in Table 1.

The raw powder samples obtained in Examples 2 to 17 were detected with CHN elemental analysis respectively, and the results showed that the ratios of C/N fluctuated at a range of 6.0±0.05. The chemical compositions of the raw powders of molecular sieves were obtained by normalization of CHN and XRF results, which were 0.25DIPA.$(Si_{0.01}Al_{0.50}P_{0.49})O_2$, 0.04DIPA.$(Si_{0.30}Al_{0.45}P_{0.25})O_2$, 0.06DIPA.$(Si_{0.25}Al_{0.40}P_{0.35})O_2$, 0.20DIPA.$(Si_{0.09}Al_{0.47}P_{0.44})O_2$, 0.10DIPA.$(Si_{0.15}Al_{0.45}P_{0.40})O_2$, 0.03DIPA.$(Si_{0.10}Al_{0.48}P_{0.42})O_2$, 0.05DIPA.$(Si_{0.13}Al_{0.45}P_{0.42})O_2$, 0.07DIPA.$(Si_{0.10}Al_{0.49}P_{0.41})O_2$, 0.07DIPA.$(Si_{0.15}Al_{0.50}P_{0.35})O_2$, 0.08DIPA.$(Si_{0.07}Al_{0.06}P_{0.33})O_2$, 0.08DIPA.$(Si_{0.08}Al_{0.49}P_{0.43})O_2$, 0.12DIPA.$(Si_{0.09}Al_{0.49}P_{0.42})O_2$, 0.09DIPA.$(Si_{0.09}Al_{0.47}P_{0.44})O_2$ and 0.10DIPA.$(Si_{0.10}Al_{0.50}P_{0.40})O_2$, respectively.

The raw powder samples obtained in Examples 2 to 17 were detected with $^{13}C$ MAS NMR analysis respectively, only the characteristic $^{13}C$ resonance of DIPA was observed without any characteristic $^{13}C$ resonance of surfactant BM which had been added observed, indicating surfactant BM which had been added didn't enter into the final products.

EXAMPLE 18

The amount of ingredients and the crystallization conditions were shown in Table 1, and the synthesis process was the same as Example 1, except that the crystallization is carried out statically and the surfactant BM was changed to a mixture of CTAB and OTAB. The sample was detected with XRD.

XRD data of sample were similar to Table 2, which showed that each corresponding peak had the same peak position and the ±10% difference of peak intensity, indicating the sample prepared was SAPO-34 molecular sieve.

The elemental analysis of the surface composition and the bulk composition of the sample were detected with XPS and XRF, and the ratios of the surface Si content to the bulk Si content were shown in Table 1.

The raw powder sample obtained in Example 18 was detected with CHN elemental analysis respectively, and the result showed that the ratio of C/N was 5.95. The chemical compositions of the raw powders of molecular sieves were obtained by normalization of CHN and XRF results, which was $0.08DIPA.(Si_{0.08}Al_{0.49}P_{0.43})O_2$.

The raw powder sample obtained in Example 18 was detected with $^{13}C$ MAS NMR analysis respectively, only the characteristic $^{13}C$ resonance of DIPA was observed without any characteristic $^{13}C$ resonances of CTAB or OTAB observed, indicating CTAB or OTAB didn't enter into the final product.

EXAMPLE 19

The amount of ingredients and the crystallization conditions were shown in Table 1, and the synthesis process was the same as Example 1, except that the crystallization is carried out statically and the surfactant was changed to a mixture of CTAB, CTAC and DTAB. The sample was detected with XRD. XRD data of sample were similar to Table 2, which showed that each corresponding peak had the same peak position and the ±10% difference of peak intensity, indicating the sample prepared was SAPO-34 molecular sieve.

The raw powder sample obtained in Example 19 was detected with CHN elemental analysis respectively, and the result showed that the ratio of C/N was 5.99. The chemical compositions of the raw powders of molecular sieves were obtained by normalization of CHN and XRF results, which was $0.09DIPA.(Si_{0.08}Al_{0.50}P_{0.42})O_2$.

The raw powder sample obtained in Example 19 was detected with $^{13}C$ MAS NMR analysis respectively, only the characteristic $^{13}C$ resonance of DIPA was observed without any characteristic $^{13}C$ resonances of CTAB, CTAC or DTAB observed, indicating CTAB, CTAC or DTAB didn't enter into the final product.

EXAMPLE 20

3 g of the samples obtained in Examples 1 to 19 respectively, were put into plastic beaker, adding 3 ml of 40% hydrofluoric acid to dissolve the framework of molecular sieve under ice-bath condition, and then adding 15 ml of tetrachloromethane to dissolve the organic compounds. The organic compounds were analyzed with GC-MS. The results indicated that the organic compound in the samples obtained in Examples 1 to 19 all was diisopropylamine.

EXAMPLE 21

The sample obtained in Example 1 was immobilized using epoxy resin and polished at a glazing machine. The composition analysis from the core to the shell was detected with SEM-EDX linear scanning of the crystal section near the crystal core. The result indicated that the atomic ratio of Si/Al near the core area of the crystal was about 0.14 and the atomic ratio of Si/Al near the surface area of the crystal was about 0.17.

The sample obtained in Example 11 (with the morphology of rhombic octahedron and the crystal size from 1 μm to 5 μm according to the SEM photo) was immobilized using epoxy resin and polished at a glazing machine. The composition analysis from the core to the shell was detected with SEM-EDX linear scanning of the crystal section near the crystal core. The result indicated that the atomic ratio of Si/Al near the core area of the crystal was about 0.16 and the atomic ratio of Si/Al near the surface area of the crystal was about 0.22.

COMPARATIVE EXAMPLE 1

Without Addition of a Surfactant

The amount of ingredients, the synthesis process and the crystallization conditions were the same as Example 1, except without addition of CTAB in the initial gel mixture. The sample was detected with XRD. XRD data of sample were similar to Table 2, which showed that each corresponding peak had the same peak position and the ±10% difference of peak intensity, indicating the sample prepared was SAPO-34 molecular sieve. The relative crystallinity of the sample obtained in Comparative Example 1 was 90% of the sample obtained in Example 1 (defining the crystallinity of the sample obtained in Example 1 as 100%).

Relative crystallinity=$(I_1+I_2+I_3) \times 100\%/(I_1'+I_2'+I_3')$, wherein $I_1$, $I_2$ and $I_3$ are the intensities of the three strongest diffraction peaks in X-ray diffraction spectrogram of the sample obtained in Comparative Example 1; $I_1'$, $I_2'$ and $I_3'$ are the intensities of the three strongest diffraction peaks in X-ray diffraction spectrogram of the sample obtained in Example 1.

The elemental analysis of the surface composition and the bulk composition of the sample were detected with XPS and XRF, respectively, showing that the ratio of the surface Si content to the bulk Si content $Si_{surface}/Si_{bulk}$ was 2.2.

EXAMPLE 22

The sample obtained in Example 1 was calcined at 600° C. for 4 hours in air, then pressed, crushed and sieved to 20-40 mesh. 5.0 g of the sample was added into a batch reactor loaded 30 mL of ethanol to carry out an ethanol dehydration evaluation. The reaction was carried out at 150° C. under stirring. The result showed that ethanol conversion reached 90% and the selectivity for ether in products was 90%.

EXAMPLE 23

The sample obtained in Example 1 was calcined at 600° C. for 4 hours in air, then pressed, crushed and sieved to 20-40 mesh. 1.0 g of a sample was weighted and loaded into a fixed bed reactor to carry out a methanol to olefins reaction evaluation. The sample was activated at 550° C. for 1 hour in nitrogen gas and reduced to 450° C. to perform a reaction. Methanol was carried by nitrogen gas with a flow rate of 40 mL/min and the Weight Hour Space Velocity of the methanol was 2.0 $h^{-1}$. The reaction products were analyzed by an on-line gas chromatograph (Varian3800, FID detector, capillary column was PoraPLOT Q-HT). The results were shown in Table 3.

TABLE 3

The result of methanol to olefins on the sample

| | | Selectivity (mass %)* | | | | | | | |
|---|---|---|---|---|---|---|---|---|---|
| Sample | Life (min) | $CH_4$ | $C_2H_4$ | $C_2H_6$ | $C_3H_6$ | $C_3H_8$ | $C_4^+$ | $C_5^+$ | $C_2H_4 + C_3H_6$ |
| Example 1 | 206 | 1.2 | 51.0 | 0.64 | 37.2 | 0.64 | 7.3 | 1.2 | 88.2 |

*The highest (ethylene + propylene) selectivity when methanol conversion was 100%.

COMPARATIVE EXAMPLE 2

The sample obtained in Comparative Example 1 was calcined at 600° C. for 4 hours in air, then pressed, crushed and sieved to 20-40 mesh. 1.0 g of a sample was weighted and loaded into a fixed bed reactor to carry out a methanol to olefins reaction evaluation. The sample was activated at 550° C. for 1 hour in nitrogen gas and reduced to 450° C. to perform a reaction. Methanol was carried by nitrogen gas with a flow rate of 40 mL/min and the Weight Hour Space Velocity of the methanol was 2.0 $h^{-1}$. The reaction products were analyzed by an on-line gas chromatograph (Varian3800, FID detector, capillary column was PoraPLOT Q-HT). The results were shown in Table 4.

TABLE 4

The result of methanol to olefins on the sample

| | | Selectivity (mass %)* | | | | | | | |
|---|---|---|---|---|---|---|---|---|---|
| Sample | Life (min) | $CH_4$ | $C_2H_4$ | $C_2H_6$ | $C_3H_6$ | $C_3H_8$ | $C_4^+$ | $C_5^+$ | $C_2H_4 + C_3H_6$ |
| Comparative Example 1 | 106 | 1.37 | 41.14 | 0.50 | 38.60 | 1.23 | 12.07 | 3.97 | 80.6 |

*The highest (ethylene + propylene) selectivity when methanol conversion was 100%.

The invention claimed is:

1. A SAPO-34 molecular sieve with a chemical composition in the anhydrous state is expressed as:

mDIPA.$(Si_xAl_yP_z)O_2$;

wherein, DIPA is diisopropylamine existing in cages and pore channels of the molecular sieve; m is the molar number of diisopropylamine per one mole of $(Si_xAl_yP_z)O_2$, and m is from 0.03 to 0.25;

x, y, z respectively represents the molar number of Si, Al, P, and x is from 0.01 to 0.30, and y is from 0.40 to 0.60, and z is from 0.25 to 0.49, and x+y+z=1;

wherein the molecular sieve is a molecular sieve crystal and there is a slight Si surface enrichment phenomenon on the molecular sieve crystal, and the ratio of the surface Si content to the bulk Si content of the crystal ranges from 1.48 to 1.01; wherein the Si content is calculated by the molar ratio of Si/(Si+Al+P).

2. The SAPO-34 molecular sieve according to claim 1, wherein in X-ray diffraction spectrogram of the SAPO-34 molecular sieve, the diffraction peaks are included as follows:

| No. | 2θ |
|---|---|
| 1 | 9.5177 |
| 2 | 12.7987 |
| 3 | 14.1388 |
| 4 | 15.9829 |
| 5 | 18.1242 |

-continued

| No. | 2θ |
|---|---|
| 6 | 20.5413 |
| 7 | 22.278 |
| 8 | 23.0981 |
| 9 | 25.3853 |
| 10 | 25.7835 |
| 11 | 27.5448 |
| 12 | 28.5382 |
| 13 | 29.5454 |
| 14 | 30.4947 |
| 15 | 31.3812 |
| 16 | 34.3501 |

-continued

| No. | 2θ |
|---|---|
| 17 | 36.4789 |
| 18 | 39.6546 |
| 19 | 43.4168 |
| 20 | 47.4822 |
| 21 | 49.1405 |
| 22 | 50.4542 |
| 23 | 51.1735 |
| 24 | 53.0514 |
| 25 | 53.9912 |
| 26 | 54.7895 |
| 27 | 55.7846 |
| 28 | 56.4017 |
| 29 | 59.6235 |
| 30 | 60.8263. |

3. The SAPO-34 molecular sieve according to claim 1, wherein the ratio of the surface Si content to the bulk Si content of the crystal ranges from 1.42 to 1.02.

4. The SAPO-34 molecular sieve according to claim 1, wherein the ratio of the surface Si content to the bulk Si content of the crystal ranges from 1.36 to 1.03.

5. The SAPO-34 molecular sieve according to claim 1, wherein the ratio of the surface Si content to the bulk Si content of the crystal ranges from 1.33 to 1.03.

6. A method for preparing the SAPO-34 molecular sieve according to claim 1, including the steps as follows:

(a) mixing a silicon source, an aluminum source, a phosphorus source, a surfactant BM, deionized water and structural-directing agent DIPA, and obtaining an initial gel mixture having the following molar ratio:

$SiO_2/Al_2O_3$ is from 0.05 to 1.5;
$P_2O_5/Al_2O_3$ is from 0.5 to 1.5;
$H_2O/Al_2O_3$ is from 16 to 150;
$DIPA/Al_2O_3$ is from 2.0 to 5.9;
$BM/Al_2O_3$ is from 0.001 to 0.05;

(b) transferring the initial gel mixture into a synthetic kettle, then sealing and heating to crystallization temperature range from 150° C. to 220° C., crystallizing for crystallization time range from 0.5 h to 72 h under an autogenous pressure; and (c) after finishing the crystallization, separating the solid product, followed by washing and drying to obtain the SAPO-34 molecular sieve;

wherein, the structural-directing agent DIPA is diisopropylamine; said surfactant BM is alkyl ammonium halide.

7. The method according to claim 6, wherein the silicon source is one or more selected from silica sol, active silica, orthosilicate esters and metakaolin; the aluminum source is one or more selected from aluminum salts, activated alumina, aluminum alkoxide and metakaolin; and the phosphorus source is one or more selected from phosphoric acid, diammonium hydrogen phosphate, ammonium dihydrogen phosphate, organophosphorous compounds and phosphorus oxides.

8. The method according to claim 6, wherein in the initial gel mixture, the surfactant BM is one or more selected from dodecyl trimethylammonium chloride, tetradecyl trimethylammonium chloride, cetyl trimethylammonium chloride, octadecyl trimethylammonium chloride, dodecyl trimethylammonium bromide, tetradecyl trimethylammonium bromide, cetyl trimethylammonium bromide, and octadecyl trimethylammonium bromide.

9. The method according to claim 6, wherein in the initial gel mixture, the molar ratio of $H_2O/Al_2O_3$ is from 26 to 120.

10. The method according to claim 6, wherein in the initial gel mixture, the molar ratio of $DIPA/Al_2O_3$ is from 3.0 to 5.0.

11. The method according to claim 6, wherein in the initial gel mixture, the molar ratio of $BM/Al_2O_3$ is from 0.001 to 0.03.

12. The method according to claim 6, wherein the crystallization temperature ranges from 180° C. to 210° C.; the crystallization time ranges from 1 h to 24 h.

13. The method according to claim 6, wherein in the initial gel mixture the molar ratio of $H_2O/Al_2O_3$ is from 31 to 100.

14. The method according to claim 6, wherein the crystallization temperature ranges from 190° C. to 210° C.

15. The method according to claim 6, wherein the crystallization time ranges from 1 h to 24 h.

16. The method according to claim 15, wherein the crystallization time ranges from 1 h to 12 h.

17. A process for producing ethylene from ethanol using a catalyst, wherein said catalyst is obtained by calcining at least one of the SAPO-34 molecular sieves according to claim 1, at a temperature from 400 to 700° C. in air.

18. A process for producing olefins from an oxygenate using a catalyst, wherein the catalyst is obtained by calcining at least one of the SAPO-34 molecular sieves according to claim 1 at a temperature from 400 to 700° C. in air.

* * * * *